Patented Dec. 22, 1925.

1,566,742

UNITED STATES PATENT OFFICE.

HERMANN FRITZSCHE AND PAUL SCHÄDELI, OF BASEL, SWITZERLAND, ASSIGNORS TO THE FIRM SOCIETY OF CHEMICAL INDUSTRY IN BASLE, OF BASEL, SWITZERLAND.

AROMATIC DERIVATIVE OF CYANURIC CHLORIDE AND PROCESS FOR PRODUCING SAME.

No Drawing. Application filed March 26, 1925. Serial No. 18,600.

*To all whom it may concern:*

Be it known that we, HERMANN FRITZSCHE and PAUL SCHÄDELI, both citizens of the Swiss Confederation, and residing at Basel, Switzerland, have invented new and useful Improvements in Aromatic Derivatives of Cyanuric Chloride and Process for Producing Same, of which the following is a full, clear, and exact specification.

The invention relates to new products which are valuable for the manufacture of dyestuffs or other products.

It has been found that new nucleal condensation products may be obtained by causing one to two molecular proportions of α-naphthol and two to one molecular proportions of any other aromatic compound adapted of yielding nucleal condensation products to react in any desired sequence on one molecular proportion of a cyanuric halide.

There are thus obtained products of the general formula:

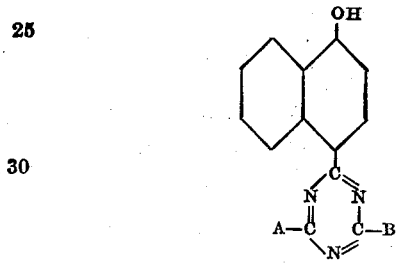

wherein A and B stand for any aromatic nuclei, of which one only may be a p-hydroxynaphthalene nucleus. The new products when obtained by acidification of their alkaline solutions, form red to red-violet and brown powders, insoluble in water, dissolving in caustic soda solution with yellow, in concentrated sulfuric acid with red to violet coloration; they are valuable parent materials for the manufacture of dyestuffs.

*Example 1.*

93 parts of cyanuric chloride and 93 parts of aluminim chloride are introduced into 1500 parts of carbon disulfide. After 5 minutes 144 parts of α-naphthol are added in small portions and the mixture is stirred for 10–12 hours. The product of reaction is separated from the diluent and treated in the same vessel for 8 hours and near the boiling point temperature of the xylene with 1500 parts of the diluent and 50 parts of aluminum chloride. The product of reaction, which is most probably the 2.4-di-p-hydroxynaphthyl-6-xylyl-1.3.5-triazine is purified by repeated dissolution in caustic soda solution and precipitation with acids. It forms a red-brown powder dissolving in caustic soda solution with yellow, in concentrated sulfuric acid with red-violet coloration. It corresponds very probably with the formula:

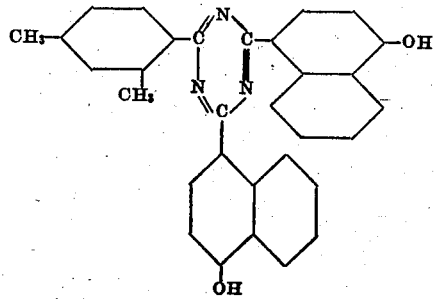

*Example 2.*

72 parts of α-naphthol, 93 parts of cyanuric chloride and 144 parts of β-naphthol are introduced into 1500 parts of tetrachloroethane. The compounds being well mixed, 93 parts of aluminium chloride are added and the whole heated for some hours at 140° C. The tetrachlorethane is then distilled with steam and the residue dissolved several times in caustic soda solution and precipitated with acids. The 2-p-hydroxynaphthyl-4.6-di-β-hydroxynaphthyl-1.3.5-triazine forms a brown powder, dissolving in caustic soda solution with yellow, in concentrated sulfuric acid with violet coloration and corresponds very probably with the formula:

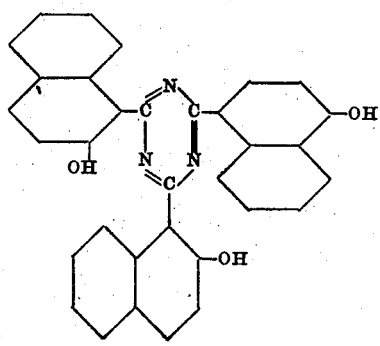

Example 3.

39.9 parts of the nucleal condensation product from 1 molecular proportion of cyanuric chloride and 2 molecular proportions of α-naphthol are suspended in 300 parts of tetrachlorethane. 20 parts of resorcin and 25 parts of aluminium chloride are then added and the temperature is maintained for 12-15 hours at the boiling point of the tetrachlorethane which is then driven off by distillation with steam. The residue is purified by repeated dissolution in caustic soda solution and precipitation with acids. There is thus obtained a brown-red powder, dissolving in caustic soda solution with yellow, in concentrated sulfuric acid with red coloration, and which is most probably the 2.4-di-p-hydroxynaphthyl-6-resorcyl-1.3.5-triazine of the formula:

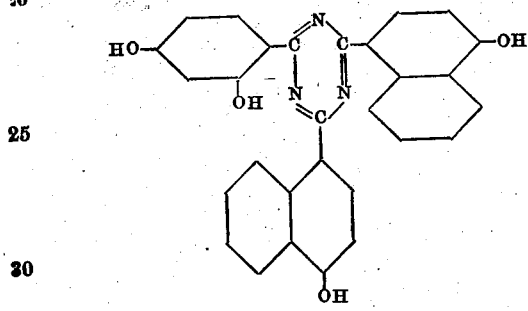

Example 4.

39.9 parts of the nucleal condensation product from 1 molecular proportion of cyanuric chloride and 2 molecular proportions of α-naphthol are suspended in 300 parts of tetrachlorethane, 30 parts of β-naphthol and 40 parts of aluminium chloride being then added. The mixture is heated to 140° C. and the diluent distilled off with steam. The residue is purified as mentioned in the preceding example. The 2.4-di-p-hydroxynaphthyl - 6 - β - hydroxynaphthyl - 1.3.5 - triazine forms a minimum-red colored powder, dissolving in caustic soda solution with yellow, in concentrated sulfuric acid with violet coloration.

Example 5.

A mixture of 93 parts of aluminium chloride and 93 parts of cyanuric chloride is introduced into 1500 parts of carbon disulfide. 144 parts of α-naphthol are then added in small portions and the whole stirred over night. The 2.4-di-para-hydroxynaphthyl-6-chloro-1.3.5-triazine is filtered, dried and condensed further with 1000 parts of carbon disulfide, 80 parts of β-naphthol-methyl-ether and 50 parts of aluminium chloride. The raw product is purified by dissolving it several times in caustic soda solution and precipitation with acids. A red-brown powder is obtained, dissolving in caustic soda solution with yellow, in concentrated sulfuric acid with violet coloration; it is most probably the 2.4-di-para-hydroxynaphthyl-6-β-methoxynaphthyl-1.3.5-triazine.

Example 6.

50 parts of 2.4-di-para-hydroxynaphthyl-6-chloro-1.3.5-triazine are prepared according to the directions of Example 1 and suspended in 1000 parts of tetrachlorethane and then heated for 6 hours at 140° C. with 20 parts of p-cresol and 50 parts of aluminium chloride. The diluent is distilled with steam and the residue purified by repeated dissolution in caustic soda solution and precipitation with acids. The 2.4-di-para-hydroxynaphthyl-6-para-cresyl-1.3.5-triazine forms a red-brown powder, dissolving in dilute caustic soda solution with yellow, in concentrated sulfuric acid with red-violet coloration. The 2.4-di-para-hydroxynaphthyl-6-anthracene-1.3.5-triazine, prepared in the same manner from 2.4-di-para-hydroxynaphthyl-6-chloro-1.3.5-triazine and anthracene, forms a red-violet powder, dissolving in caustic soda solution with yellow, in concentrated sulfuric acid with violet coloration. The two substances of this example correspond probably with the following formulas:

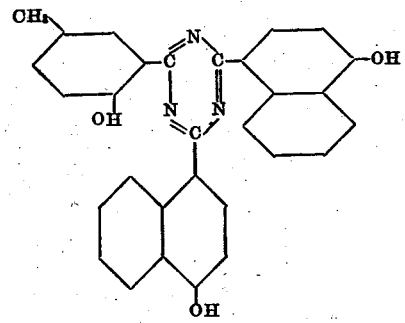

and

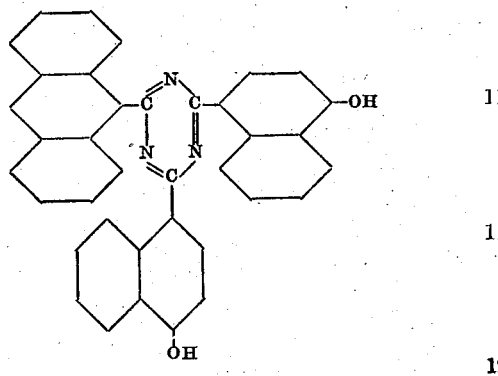

What we claim is:

1. The herein described process for making cyanuric chloride derivatives, consisting in causing one to two molecular proportions of α-naphthol and two to one molecular proportions of another aromatic compound adapted of yielding nuclear condensation products to react in any desired sequence on one molecular proportion of a cyanuric halide.

2. The herein described process for making cyanuric chloride derivatives, consisting in causing two molecular proportions of α-naphthol and one molecular proportion of another aromatic compound adapted of yielding nuclear condensation products to react in any desired sequence on one molecular proportion of a cyanuric halide.

3. The herein described process for making cyanuric chloride derivatives, consisting in causing two molecular proportions of α-naphthol and one molecular proportion of another aromatic hydroxy compound adapted of yielding nuclear condensation products to react in any desired sequence on one molecular proportion of a cyanuric halide.

4. The herein described process for making cyanuric chloride derivatives, consisting in causing two molecular proportions of α-naphthol and one molecular proportion of another hydroxy compound of the naphthalene series adapted of yielding nuclear condensation products to react in any desired sequence on one melocular proportion of a cyanuric halide.

5. The herein described process for making cyanuric chloride derivatives, consisting in causing two molecular proportions of α-naphthol and one molecular proportion of β-naphthol to react on one molecular proportion of a cyanuric halide.

6. As new products the new compounds of the general formula:

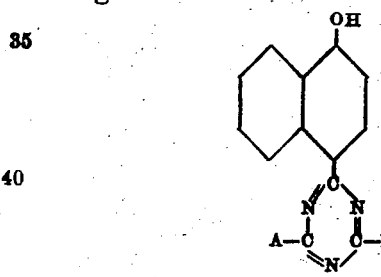

wherein A and B stand for any aromatic nuclei, of which one only may be a p-hydroxynaphthalene nucleus, the new products forming, when obtained by acidification of their alkaline solutions, red to red-violet and brown powders, insoluble in water, dissolving in caustic soda solution with yellow, in concentrated sulfuric acid with red to violet coloration.

7. As new products the new compounds of the general formula:

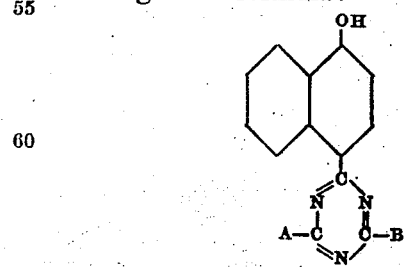

wherein A and B stand for any aromatic nuclei, of which one only is a p-hydroxynaphthalene nucleus, the new products forming, when obtained by acidification of their alkaline solutions red to red-violet and brown powders, insoluble in water, dissolving in caustic soda solution with yellow, in concentrated sulfuric acid with red to violet coloration.

8. As new products the new compounds of the general formula:

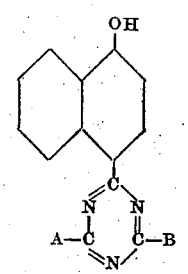

wherein A and B stand for any aromatic nuclei, of which one only is a p-hydroxynaphthalene nucleus and the other another aromatic hydroxy compound, the new products forming, when obtained by acidification of their alkaline solutions, red to red-violet and brown powders, insoluble in water, dissolving in caustic soda solution with yellow, in concentrated sulfuric acid with red to violet coloration.

9. As new products the new compounds of the general formula:

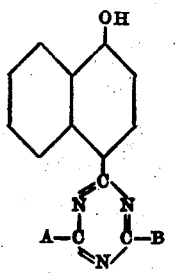

wherein A and B stand for any aromatic nuclei, of which one only is a p-hydroxynaphthalene nucleus and the other an aromatic hydroxy compound of the naphthalene series, the new products forming, when obtained by acidification of their alkaline solutions, red to brown powders, insoluble in water, dissolving in caustic soda solution with yellow, in concentrated sulfuric acid with violet coloration.

10. As a new product the new compound of the general formula:

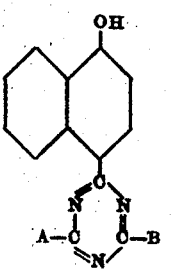

wherein A and B stand for any aromatic nuclei, of which one only is a p-hydroxy-naphthalene nucleus and the other the β-naphthol, the new product forming when obtained by acidification of its alkaline solution a red powder, insoluble in water, dissolving in caustic soda solution with yellow, in concentrated sulfuric acid with violet coloration.

In witness whereof we have hereunto signed our names this 14th day of March, 1925.

HERMANN FRITZSCHE.
PAUL SCHÄDELI.